United States Patent [19]

Birchall et al.

[11] 4,353,747

[45] Oct. 12, 1982

[54] HYDRAULIC CEMENT COMPOSITION

[75] Inventors: James D. Birchall, Mouldsworth; Kevin Kendall, Runcorn, both of England

[73] Assignee: Imperial Chemical Industries Limited, London, England

[21] Appl. No.: 160,370

[22] Filed: Jun. 17, 1980

[30] Foreign Application Priority Data

Jun. 29, 1979 [GB] United Kingdom ................. 7922788

[51] Int. Cl.³ .................................................. C04B 7/02
[52] U.S. Cl. ......................................... 106/89; 106/97
[58] Field of Search .................................... 106/89, 97

[56] References Cited

U.S. PATENT DOCUMENTS

| 4,032,353 | 6/1977 | Ball et al. | 106/97 |
| 4,160,674 | 7/1979 | Sawyer | 106/89 |

OTHER PUBLICATIONS

Grudemo, "Pore Structure and Properties of Materials", International Symposium, vol. V, p. D-149, (1974).

*Primary Examiner*—James Poer
*Attorney, Agent, or Firm*—Cushman, Darby & Cushman

[57] ABSTRACT

A hydraulic cement composition comprising a mixture of at least one particulate hydraulic cement and water in which the weight average mean particle size of the particles of the cement is less than 20 microns and in which the proportion of water is not greater than 30% by weight of the hydraulic cement in the composition, the cement being preferably substantially free of particles having a size above 20 microns and the proportion of water being preferably not greater than 20% by weight.

13 Claims, No Drawings

HYDRAULIC CEMENT COMPOSITION

This invention relates to a hydraulic cement composition.

In cement compositions comprising a hydraulic cement, e.g. Portland cement, water, and optionally other materials, e.g. sand and aggregate, the hydraulic cement which is used conventionally has a mean particle size of about 25 microns. Thus, the mean particle size of the hydraulic cement on a weight average basis is about 25 microns, although the cement may contain some fine particles having a size much less than 25 microns, and also some coarser size particles having a size greater than 25 microns. Typically the maximum size in such a hydraulic cement, e.g in ordinary Portland cement, is about 150 microns.

The strengths of cementitious products produced by setting of such cement compositions are generally quite low, and in particular the flexural strengths of such cementitious products are low. Thus, where the cement composition comprises a hydraulic cement of conventional particle size range and an amount of water which is conventionally used in such compositions the flexural strength of the product produced by setting of the compositions may be as low as 5 to 10 MPa.

We have found that provided the mean particle size of the hydraulic cement in a composition containing the cement and water is less than that conventionally used, and provided the composition contains only a small proportion of water, the properties of a cementitious product produced from the composition are improved, in particular the flexural strength is improved, when compared with the properties of a cementitous product produced from a composition containing a hydraulic cement of conventional particle size range and a proportion of water conventionally used in such compositions. Indeed, the flexural strengths of the cementitious products may be at least as great as, and may be superior to, the flexural strengths of reinforced cementitous products, for example containing fibrous reinforcement, such as are described for example by D J Hannant in Fibre Cements and Concretes, (Wiley, London 1978). The high strengths of the cementitious products produced from the hydraulic cement compositions of the present invention are not, however, dependent on the use of reinforcement, for example fibrous reinforcement.

According to the present invention there is provided a hydraulic cement composition comprising a mixture of at least one particulate hydraulic cement and water in which the weight average mean particle size of the particles of the cement is less than 20 microns and in which the proportion of water is not greater than 30% by weight of the hydraulic cement in the composition.

The cement composition may be set to produce a cementitious product, as hereinafter described.

We have found that variation of the mean particle size of the hydraulic cement in a cement composition comprising hydraulic cement and water over a range from approximately 150 microns down to 25 microns has little if any effect on the properties of cementitious products produced by setting of the compositions, and in particular has little if any effect on the flexural strengths of the products, even where the main particle size of the hydraulic cement is reduced to a value as low as 25 microns. However, the properties of such products, and in particular the flexural strengths of such products, are improved where the hydraulic cement in the composition has a weight average mean particles size of less than 20 microns. Indeed there is a progressive improvement in properties of the cementitious products, and in particular a progressive increase in flexural strength, with decrease in the weight average mean particle size below 20 microns. However, with progressive decrease in the weight average mean particle size of the hydraulic cement the water-containing cement composition becomes progressively more difficult to process, as it becomes progressively less fluid, for a given proportion of water to hydraulic cement, especially where the composition contains a low proportion of water. For this reason we prefer that the weight average mean particle size of the hydraulic cement is at least 1 micron. A weight average mean particle size of the hydraulic cement in the range 2 microns to 15 microns is more preferred.

It is also preferred that the hydraulic cement is substantially free of particles having a size above 30 microns, and is more preferably substantially free of particles having a size above 20 microns as cementitious products produced from such compositions have even greater flexural strengths.

By the term "hydraulic cement" we mean any material which sets and hardens by the addition of water and which thus sets and hardens in the presence of water. The hydraulic cement may be a silicate (siliceous) cement, for example Portland cement. It may also be an aluminate (aluminous) cement, for example a calcium aluminate cement, or a calcium sulphate hemihydrate ("Plaster of Paris") cement. Mixtures of different hydraulic cements may be used if desired.

Hydraulic cement of the desired weight average mean particle size may be produced, for example, by conventional particle size classification techniques, e.g. by air classification or by sieving a commercially available cement. In order to produce a greater proportion of hydraulic cement having the desired particle size commercially available cement may be classified or it may first be ground and then classified. Cement having a particle size larger than that desired and which has been separated by classification may be ground and then re-classified.

The weight average particle size of the hydraulic cement may be determined by conventional techniques, for example, by air elutriation or by sieve analysis.

The properties of a cementitious product produced from the hydraulic cement composition are dependent inter alia on the proportion of water to cement used in the composition, and it is desirable, in order to produce high strength cementitious products from the composition, to use as little water as possible consistent with achieving adequate fluidity in the composition. Desirably the proportion of water is not greater than 25%, and is preferably not greater than 20% by weight of the hydraulic cement in the composition. In general, in order to maintain fluidity of the cement composition it may be necessary to use at least 12% of water by weight of hydraulic cement in the composition. The amount of water which it is necessary to use in order to achieve a cement composition of adequate fluidity may depend on the presence in the composition of other materials, e.g. sand and/or aggregate. The presence of such materials may require a greater amount of water to be used than would otherwise be necessary.

As the composition contains particularly low proportions of water it is especially desirable to include in the composition one or more processing additives which facilitate the mixing of hydraulic cement with water.

Such additives may be, for example, (a) a polymer having a lubricating action on the cement particles, or
(b) an additive having a dispersing action on the particles, for example a surfactant, or a mixture of such additives.

Examples of such additives include (i) cellulose ethers, for example hydroxypropyl methyl cellulose,
(ii) amide-substituted polymers, for example a polymer or copolymer of acrylamide,
(iii) polyalkylene oxide derivatives which may be for example a polyalkylene oxide (alternatively described as a polyalkylene glycol), for example polyalkylene glycols of molecular weight above about 10,000, or polyalkoxy derivatives of alcohols, phenols, or the like,
(iv) sulphonated materials of the kind known in the art for imparting plasticising properties, for example lignosulphonates and sulphonated naphthalene salts.

The processing additive may be used, for example, in a proportion of 0.5 to 10% by weight of the hydraulic cement in the composition.

The cement composition may be made by mixing water with the hydraulic cement or with a mixture of the hydraulic cement and any other materials required to be present. Where the composition is to contain a processing additive the additive is preferably used in the form of an aqueous solution or dispersion of the additive. For example, an aqueous solution or dispersion of the processing additive may be mixed with the hydraulic cement or with a mixture of the hydraulic cement and water.

Where high strength cementitious products are required it is particularly desirable that the cement composition be thoroughly mixed, and it is preferred that the composition be mixed under conditions of high shear. For example, the composition may be mixed on a Banbury mixer or in a screw extruder. However, the composition is preferably mixed under conditions of high shear on a twin-roll mill by passing the composition repeatedly through the nip between the rolls of the mill, this procedure producing a thoroughly well mixed composition.

The hydraulic cement composition may be shaped or otherwise formed easily and conveniently by use of relatively low pressures, although we do not exclude the use of high pressures. If desired the composition may be shaped by, for example extrusion or shaping in a press e.g. in a hydraulic press.

It may be of advantage, and indeed it is preferred, in order to assist the control of the porosity characteristics of the cementitious product, to effect the setting of the composition under an applied pressure and to release the pressure not before the setting has proceeded at least to the extent that the composition does not relax on release of the pressure, that is does not change substantially in dimensions on release of the pressure. The applied pressure need only be low, for example, up to 5 MPa. The time for which the pressure may be applied will depend inter alia on the nature of the hydraulic cement and on the temperature and humidity employed in the setting process, and may be determined by experiment.

The setting may be effected at ambient temperature although setting may be accelerated by use of elevated temperatures.

The setting is also desirably effected in a humid atmosphere, e.g. in an atmosphere of substantially 100% relative humidity.

Thus the setting of the hydraulic cement composition may be achieved in conventional manner, for example by maintenance in a humid atmosphere, preferably of relative humidity at or near 100%, for a period of 0.5 to 28 days. An alternative method is to maintain the composition at elevated temperature and pressure and high humidity, to accelerate setting of the composition.

The cement composition may contain, in addition to the hydraulic cement, water and aforementioned processing additives, other materials known in the art, for example fillers and/or aggregates conventional in the art, dispersing aids, setting modifiers (e.g. gypsum), and materials which increase fracture toughness, for example fibrous and/or rubbery materials.

Useful fillers/aggregates include various forms of silica (sand, quartz sand, and fine amorphous silica, for example fumed silica), olivine, titania (for example the pigment grades of titania), slate powder, and mixtures thereof.

Cementitious products produced by setting of the cement compositions of the invention have high strength, particularly high flexural strength. The products may have a flexural strengths in excess of 40 MPa, and often in excess of 50 MPa, as measured by a three point bend test on an Instron machine. Flexural strengths of this order are substantially in excess of those obtained with conventional hydraulic cement compositions in the absence of reinforcement, for example, fibrous reinforcement.

The cementitious products produced from the hydraulic cement compositions of the invention have porosity characteristics similar to those described in our copending British Patent Application MD 7922208, filed 26 June 1979. thus, the cementitious product produced from the hydraulic cement composition may possess the following properties.

(i) The cementitious product may comprise of not more than 2%, based on the total volume of the product, of pores having a maximum dimension exceeding 15 microns. The proportion of such pores is that determined by the absolute method of quantitative microscopy in which a surface of a sample of the cementitious product is polished to produce a plane surface on the sample, the sample is washed to remove the polishing debris from the surface, and the surface is illuminated to ensure that the holes in the surface are contrasted with the plane part of the surface, and the surface is viewed by means of an optical microscope, typically at a magnification of x 100, or optionally by an electron microscope, and the holes exceeding 15 microns in size are determined, as described in "Quantitative Microscopy" by De Hoff and Rhines, McGraw Hill, 1968. Sufficient area of the surface of the sample is viewed to reduce the statistical error, and usually 1000 holes are counted. The sample is then subjected to further polishing in order to expose another surface and the optical or electron microscopic examination is repeated. In general ten such surfaces are examined. The total volume, including pores, of the cementitious product may be measured, for example, by use of a mercury displacement technique or by measurement of the external dimensions of the cementitious product.

(ii) The pore size distribution in the cementitious product may be substantially uniform throughout the product.

(iii) The porosity of the cementitious product, that is the total volume of the pores in the product as a proportion of the total volume of the product (including the pores) is generally not greater than 20%, and may be as low as 15% or even 10%. The porosity may be estimated by using the technique of helium comparison pyknometry to measure the volume of the material in the product and the technique of mercury displacement or measurement of the external dimensions of the product to estimate the total volume of the product (including pores).

(iv) In general in the product less than 5%, and often less than 2% of the total volume comprises pores in the size range 2 to 15 microns, as determined by quantitative microscopy.

The invention is now illustrated by the following examples in which all parts are expressed as parts by weight.

EXAMPLE 1

A sample of ordinary Portland cement was classified using an Alpine air classifier MHZ 100. MZR into two fractions one consisting of particles having a size above 10 microns and one consisting of particles having a size less than 10 microns. The latter fraction was analysed and was found to have a weight average mean particle size of 5 microns.

A dough was prepared by mixing on a twin-roll mill 40 parts of the cement having a weight average mean particle size of 5 microns and 10 parts of an aqueous gel containing 9.3 parts of water and 0.7 parts of hydroxypropyl methyl cellulose (Celacol HPM 15,000). After thorough mixing on the mill the dough was sandwiched between sheets of poly(ethylene terephthalate) and pressed into a sheet of thickness 3 mm on a hydraulic press at a pressure of 3 MPa. The sheet was allowed to stand for 7 days in a fog-box operating at 100% relative humidity and a temperature of $18\pm2°$ C., and thereafter the sheet was allowed to stand for 7 days under ambient conditions.

The cement sheet was scored to outline strips of dimensions $5.0 \text{ cm} \times 1.7 \text{ cm} \times 0.3 \text{ cm}$, the strips were separated by breaking on the scored lines, and the strips were then subjected to a 3-point bend test on an Instron machine using a span of 3.2 cm, a depth of 0.3 cm, a width of 1.7 cm, and a crosshead speed of 0.05 cm/min, and the load to failure of the strips was measured.

The flexural strength of the strips was calculated using the following formula:

$$\sigma = (1.5 \ WL/d^2w) \times (0.101325/1.0332) \text{MPa}$$

where
W = load at failure in Kg
L = span in cm
d = depth in cm
w = width in cm
$\sigma$ = flexural strength The flexural strength of the strips (average of 6 values) was 60 MPa.

The cement sheet had a porosity of 22% and pores having a maximum dimension exceeding 15 microns were virtually undetectable.

By way of comparison the above procedure was repeated in three separate experiments except that the ordinary Portland cement which was used in the cement compositions had been classified into samples having weight average mean particle sizes of respectively 25, 60 and 100 microns.

The flexural strengths of strips cut from sheets prepared from the cement compositions (average of 6 values in each case) were respectively 27, 23 and 20 MPa.

EXAMPLE 2

The procedure of Example 1 was repeated except that 61 parts of a classified calcium aluminate cement (Secar 250, Lafarge) having a weight average mean particle size of 8 microns was used in place of the ordinary Portland cement of Example 1, and an aqueous gel of 3 parts of hydroxypropyl methyl cellulose and 12 parts of water was used.

The flexural strength of the cementitious product was $50 \pm 4$ MPa.

By way of comparison the above procedure was repeated except that an unclassified calcium aluminate cement was used. The flexural strength of the cementitious product was 33 MPa.

EXAMPLE 3

The procedure of Example 1 was repeated except that 71 parts of a classified calcium sulphate hemihydrate cement having a weight average mean particle size of 3 microns was used in place of the ordinary Portland cement of Example 1, and 30 parts of an aqueous gel containing 5 parts of polyacrylamide (in place of the hydroxypropyl methyl cellulose of Example 1) and 25 parts of water were used.

The flexural strength of the cementitious product was $56 \pm 5$ MPa.

By way of comparison the above procedure was repeated except that an unclassified calcium sulphate hemihydrate cement was used. The flexural strength of the cementitious product was 27 MPa.

What we claim is:

1. A hydrualic cement composition comprising a mixture of at least one particulate hydrualic cement and water in which the weight average mean particle size of the particles of the cement is less than 20 microns and in which the proportion of water is not greater than 30% by weight of the hydraulic cement in the composition.

2. A hydraulic cement composition consisting essentially of a mixture of at least one particulate hydraulic cement and water in which the weight average mean particle size of the particles of the cement is less than 20 microns, and the hydraulic cement is substantially free of particles having a size above 20 microns in which the proportion of water is not greater than 20% by weight of the hydraulic cement in the composition, the composition when set having a flexural strength greater than 40 MPa as measured by a three point bend test on an Instron machine.

3. A composition as claimed in claim 1 in which the weight average mean particle size of the hydraulic cement is at least 1 micron.

4. A composition as claimed in claim 1 in which the weight average mean particle size of the hydraulic cement is in the range 2 microns to 15 microns.

5. A composition as claimed in claim 1 in which the hydraulic cement is substantially free of particles having a size above 30 microns.

6. A composition as claimed in claim 5 in which the hydraulic cement is substantially free of particles having a size above 20 microns.

7. A composition as claimed in claim 1 in which the proportion of water is not greater than 25% by weight of the hydraulic cement in the composition.

8. A composition as claimed in claim 7 in which the proportion of water is not greater than 20% by weight of the hydraulic cement in the composition.

9. A composition as claimed in claim 7 in which the proportion of water is at least 12% by weight of the hydraulic cement in the composition.

10. A composition as claimed in claim 1 or 2 which comprises at least one processing additive which facilitates the mixing of hydraulic cement and water.

11. A composition as claimed in claim 10 in which the processing additive is present in a proportion of 0.5% to 10% by weight of the hydrauaic cement in the composition.

12. A cementitious product produced by setting of a composition as claimed in claim 1.

13. The cementitious product of claim 12 having a flexural strength greater than 40 MPa as measured by a three point bend test on an Instron machine.

* * * * *